United States Patent [19]

Biondetti

[11] Patent Number: 4,472,958

[45] Date of Patent: Sep. 25, 1984

[54] ROLLING MILL

[75] Inventor: Mario Biondetti, Schio, Italy

[73] Assignee: Escher Wyss Aktiengesellschaft, Zurich, Switzerland

[21] Appl. No.: 330,708

[22] Filed: Dec. 14, 1981

[30] Foreign Application Priority Data

Jan. 14, 1981 [CH] Switzerland .................. 210/81

[51] Int. Cl.³ ............................................. B21B 31/32
[52] U.S. Cl. ...................................... 72/243; 72/245; 29/116 AD
[58] Field of Search ................... 72/241, 243, 245, 16; 29/113 AD, 116 AD

[56] References Cited

U.S. PATENT DOCUMENTS

| 4,023,480 | 5/1977 | Biondetti | 29/113 AD |
| 4,041,752 | 8/1977 | Dolenc et al. | 72/241 |
| 4,212,504 | 7/1980 | Keylou et al. | 72/245 |
| 4,319,522 | 3/1982 | Marchioro et al. | 29/116 AD |
| 4,357,743 | 11/1982 | Hefter et al. | 29/116 AD |

Primary Examiner—Lowell A. Larson
Assistant Examiner—Jorji M. Griffin
Attorney, Agent, or Firm—Werner W. Kleeman

[57] ABSTRACT

A rolling mill or apparatus comprises position detectors or sensors which are disposed upon movable roll shells or movable solid rolls possessing, for instance, hydraulic support or pressure elements. The position detectors act upon regulators for regulating a force differential between a larger pressing force exerted by bottom or lower support elements in relation to a lesser pressing force exerted by top or upper support elements. The excess or resultant of the pressing force produced by the bottom support or pressure elements decreases with increasing height of the position of the rolls until there is established an equilibrium position. During operation there exists an equilibrium condition between the upwardly directed force of the bottom support elements and the sum of the downwardly directed pressing force of the upper or top support elements and the weight of all of the parts therebetween.

20 Claims, 14 Drawing Figures

ROLLING MILL

BACKGROUND OF THE INVENTION

The present invention broadly relates to rolling mills and, in particular, concerns a new and improved construction of a rolling mill or apparatus.

Generally speaking, the rolling mill of the present development is of the type containing two rolls which act in opposition to one another in a substantially vertical pressing plane. These rolls have substantially cylindrical rotatable parts which act against a counter roll and which are borne substantially along their entire length and with an adjustable pressing force upon at least one support or pressure element. Each such support or pressure element is operative in the pressing direction, and these support or pressure elements of the two rolls act in opposed relationship to one another in order to produce the pressing force.

Rolling apparatuses or rolling mills of this type are well known to the art, as evidenced for instance by the rolling mill constructions disclosed in U.S. Pat. Nos. 4,041,752 and 4,059,976, Austrian Pat. No. 357,484, German Pat. Nos. 1,026,609, 1,411,327 and 1,460,632.

Although rolling mills of this type have proven to be generally satisfactory in practice, nonetheless difficulties are encountered in connection with the roll sag or bending-through which is predicated upon their inherent weight. This roll sag introduces into the roll nip or bight forces which can result in localised deviations of the pressing force from a desired value.

SUMMARY OF THE INVENTION

Therefore, with the foregoing in mind it is a primary object of the present invention to provide a new and improved construction of a rolling mill which is not afflicted with the aforementioned drawbacks and limitations of the prior art constructions.

Another and more specific object of the present invention aims at the provision of a new and improved construction of a rolling mill of the previously mentioned type, by means of which it is possible to automatically eliminate with minimum equipment expenditure the effect of the weight of the movable parts upon the distribution of the rolling force along the roll nip, so that depending upon the construction of the rolls there can be obtained a completely uniform force characteristic along the pressing gap or roll nip or in the case of rolls operating with so-called zone control there can be realised with exceedingly great accuracy the generation of the desired forces at the pressing gap or roll nip.

Still a further significant object of the present invention aims at providing a new and improved construction of a rolling mill or apparatus of the character heretofore described, which is structured in a manner such that there can be extensively avoided the detrimental effects of roll sag or bending-through of the rolls by virtue of their inherent weight which undesirably may cause deviations of the pressing force from a desired or intended value at the roll nip.

Still a further significant object of the present invention and in keeping with the above objects concerns itself with the provision of a new and improved construction of rolling mill which is relatively simple in construction and design, extremely reliable in operation, economical to manufacture, not readily subject to breakdown or malfunction, requires a minimum of maintenance and servicing, and enables realising a controlled action of the forces prevailing at the roll nip.

Now in order to implement these and still further objects of the invention, which will become more readily apparent as the description proceeds, the rolling mill of the present development is manifested by the features that at least the cylindrical rotatable parts of the rolls are movable in the pressing plane. The pairs of support or pressure elements which are effective in opposition to one another at both of the rolls are connected to a common actuation line for influencing their pressing or pressure force. The rotatable part of one of the rolls is equipped with at least one position detector or sensor for determining the position of the rotatable part in relation to a stationary or fixed part of the rolling mill. This position detector acts upon a control or regulation device arranged in the actuation line. This regulation device serves to influence a force difference or differential between a larger pressing force of the support element of the lower roll in relation to a lower pressing force of the support element of the upper roll as a function of its position. The excess or resultant of the pressure force of the support element of the lower roll decreases with increasing height of the position of the rotatable part until there is assumed an equilibrium position in such a manner that, during operation, in the equilibrium condition the upwardly directed force of the lower support element is equal to the sum of the downwardly directed pressing force of the upper support element and the weight of all of the moving parts located therebetween.

By virtue of these measures there is obtained a rolling mill by means of which there can be compensated the weight of all of the movable parts, even that of the support or pressure elements, so that there can be practically almost totally eliminated any bending-through or sag of the rolls. Consequently, there are obviated disturbances which might otherwise arise due to differences in the bending strength of the pressing rolls and also any possibly intermediately dispositioned intermediate rolls, so that there can be determined with extraordinary accuracy the pressing force in the roll nip by virtue of the pressing forces exerted by the support or pressure elements.

As can be gleaned from the previously enumerated prior art the rolls of the rolling mill of the present development can be designed in the most different fashion. Thus, the rolls preferably may be of a type possessing a stationary roll support or beam and a roll shell mounted to be rotatable about such stationary or fixed roll support. At least one support or pressure element is located between the roll support and the roll shell. Such type of roll, referred to in the art as a roll with bending or sag compensation or a controlled deflection roll, is known from U.S. Pat. No. 3,802,044, granted Apr. 9, 1974 to which reference may be readily had. With such type of controlled deflection rolls it is possible, in accordance with the teachings of the aforementioned U.S. Pat. No. 3,802,044, for the roll shell to be rotatably mounted at the roll support. The roll support together with the roll shell performs the pressing movements, and the controlled deflection roll is equipped with outer pressing or contact cylinders engaging at the ends of the roll journals.

However, it is also possible to design the roll shell in the manner of the controlled deflection roll disclosed in U.S. Pat. No. 3,885,283, granted May 27, 1975, wherein the roll shell is movable in relation to the roll support in the pressing plane in order to produce the pressing or pressing movement. With this design the roll support is braced upon a roll stand or frame.

The rotatable portion of the roll also can be constituted by the body of a solid roll which is supported upon at least one outer support or pressure element which acts upon the surface of the roll. Such type of roll construction is disclosed in the rolling mill described in the aforementioned U.S. Pat. No. 4,041,752, granted Aug. 16, 1977.

In the simplest cases the position detector or sensor can directly actuate a control element for influencing the force difference of the support elements. However, the position detector preferably can be a signal transmitter for forming a set or reference value signal for a differential regulator in order to influence the force difference of the support or pressure element. Consequently, there is obtained an appreciable simplification in the construction of the rolling mill, especially in the case of equipment having a large number of support or pressure elements, since the position detector or sensor can be located at a distance from the energy lines, for instance typically hydraulic pressure lines or conduits, which lead to the support or pressure elements.

The difference regulator can be arranged in a control signal line leading to the pressing force regulators of the support elements and which determine the pressing or pressure force. These pressing force regulators are arranged in the energy lines of the support or pressure elements. Also with this system design there is realised an appreciable simplification in the construction of the rolling mill.

It should be, however, also understood that the difference or differential regulator also can be arranged directly in the energy lines of the support elements. With this construction it is thus possible to realise a saving in approximately half the number of pressing force regulators, since the differential regulator in each case replaces one of the pressing force regulators.

As will be apparent from the foregoing discussion, the position detector or sensor forms a signal which, with increasing height of the rotatable part with which there is operatively connected the position detector, corresponds to a smaller force differential. As a rule the signal also becomes correspondingly smaller. However, an increasing signal can lead to a smaller force differential or force difference depending upon the circuit arrangement of the regulator.

Preferably, one of the rolls can be equipped at both ends of the rotatable part thereof with a respective position detector or sensor which acts upon the support or pressure elements operatively correlated to the particular side of the roll where there is disposed such position detector. Hence, with very simple means there is obtained an exact stabilisation of the roll and its rotatable part in a desired position, for instance a horizontal position. However, in principle it would be conceivable to use an arrangement of only one single position feeler in the event measures are provided through the use of other means to ensure for a parallel guiding of the roll in a manner such that it always remains in a horizontal orientation with its lengthwise axis.

Each of the rolls can be equipped in conventional fashion with a plurality of support or pressure elements or groups of support or pressure elements. The support elements or groups of support elements which are effective in opposition to one another at both of the rolls are connected in each case with a common energy line containing at least one pressing force regulator which is operatively associated with the difference or differential regulator.

With this system design a respective support element or group of support elements, as the case may be, can extend from the related end of the roll up to its intermediate or central region. The position feeler is able to influence by means of its set value the differential regulator of the support elements or the groups of support elements located at its side with the same magnitude or controlling force.

When working with an uneven number of support elements or groups of support elements the intermediate support element or the intermediate group of support elements, as the case may be, can be influenced by both position detectors with respectively one half of the controlling force or controlling magnitude.

However, it is also possible for the set value signals of the position detectors at both ends of the rolls to act upon the differential or difference regulator with decreasing influencing action as a function of the distance from the end at which there is located the related position feeler, and the sum of the influencing or controlling forces of the set value signals of both position detectors is constant at all differential or difference regulators.

Finally, it is also possible to equip the differential regulator of the support elements with additional set or reference value signals for compensation of the deviations. These additional set value signals are provided at locations of the rolls of the rolling mill at which there arise deviations from the uniform distribution of the weight. By virtue of these measures it is possible to compensate, for instance, excess weight at the ends of the rolls such as for instance guide elements, drive heads, heating connections, possibly with the aid of a regulator.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
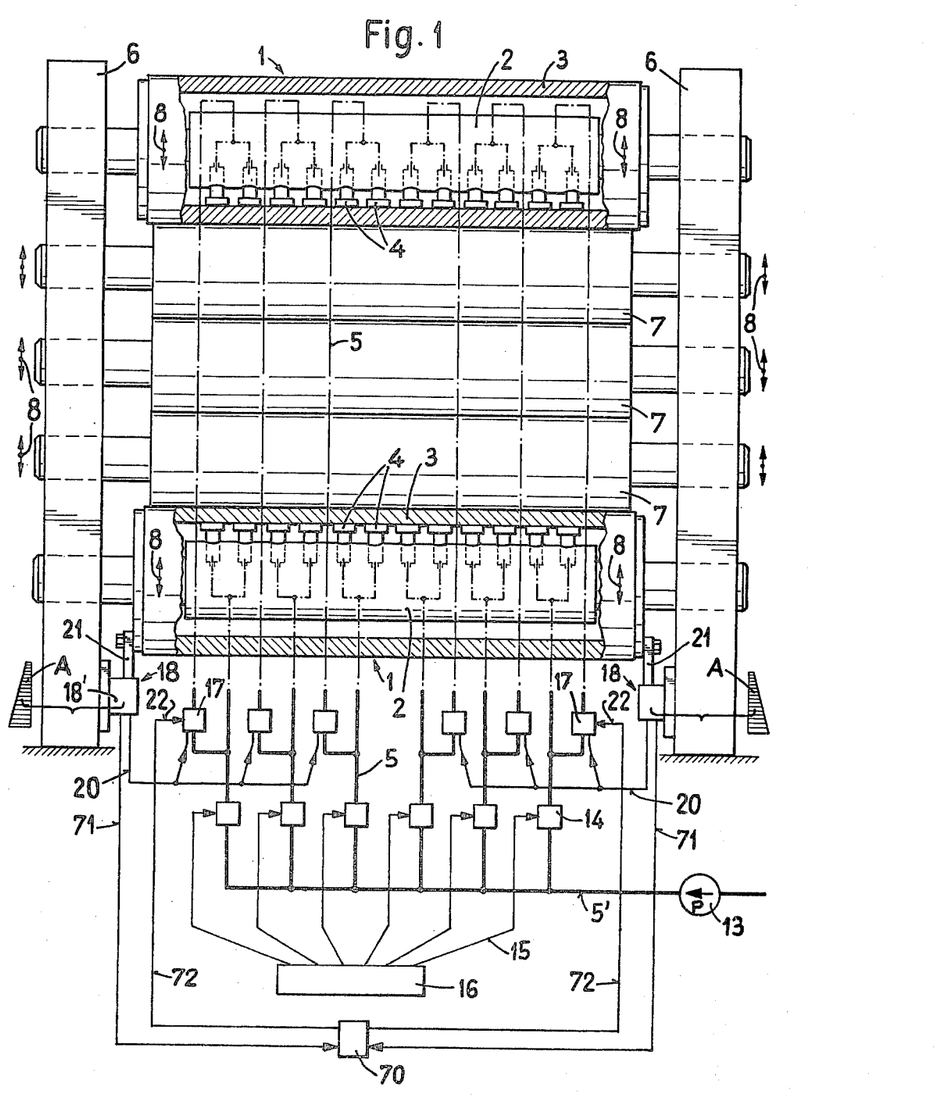
FIG. 1 is a schematic illustration of a rolling mill containing two rolls constructed in accordance with the teachings of the aforementioned U.S. Pat. No. 3,885,283 and also possessing a zone control, which enables a random setting or adjustment of the pressing force at different locations of the roll nip or pressing gap of the rolling mill.

Describing now the drawings, it is to be understood that only enough of the construction of the rolling mill or apparatus has been disclosed, in order to simplify the illustration, as is needed for those skilled in this art to readily understand the underlying principles and concepts of the present development. Turning attention now to FIG. 1 there is illustrated therein a rolling mill which will be seen to contain two rolls 1 which may be constructed in the manner disclosed in the aforementioned U.S. Pat. No. 3,885,283, to which reference may be readily had and the disclosure of which is incorporated herein by reference. To the extent needed, however, for explaining the invention the construction of such rolling mill will be herein considered. These controlled deflection rolls 1 contain stationary roll supports or beams 2, about each of which there is rotatably mounted a related tubular-shaped roll shell 3. At the roll supports 2 there are formed not particularly referenced cylinder-shaped bores for receiving piston-shaped support or pressure elements 4. In the embodiment under discussion each two such support or pressure elements 4 will be assumed to form a group of such support elements 4. These groups of support elements 4 are each connected to a related hydraulic pressure line 5 defining an actuation line. It should be however particularly understood that, in reality, each such group of pressure or support elements 4 actually contains a considerably larger number of such support elements.

As to the function of these support or pressure elements 4, namely the support pistons, which does not constitute subject matter of the present invention, reference may be particularly had to the likewise previously mentioned U.S. Pat. No. 3,802,044, the disclosure of which is incorporated herein by reference.

The ends of each of the roll supports or beams 2 are supported at side portions or side plates 6 or the like of a schematically illustrated roll stand or frame arrangement. Between the controlled deflection rolls 1 there are located the intermediate rolls 7 which are movable in the roll stand or framework within suitable guides, as the same has simply been generally schematically indicated by the double-headed arrows 8.

As likewise indicated by the arrows 8 also the roll shells 3 are movable in the vertical pressing plane in which there are located the axes of the roll shells 3 and the intermediate rolls 7.

Figure 2:
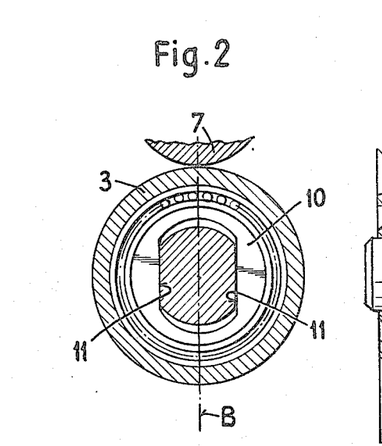
FIG. 2 is a cross-sectional view of the arrangement of FIG. 3, taken substantially along the line II—II thereof.
Figure 3:
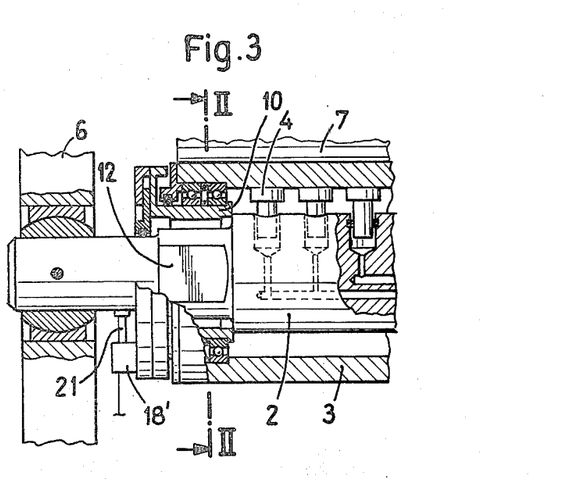
FIG. 3 is a fragmentary sectional view of one end of the roll for explaining the parallel guiding of the roll shell in relation to the roll support or beam.

As will be best seen by referring to FIGS. 2 and 3 this mobility is realised by virtue of the fact that bushings 10 are rotatably mounted at both ends in the roll shells 3. These bushings or sleeves 10 are provided with internal parallel guides 11. The roll supports or beams 2 are equipped at the location of the bushings 10 with parallel surfaces 12 which coact with the parallel guides 1. Such roll construction is known to the art from FIG. 2 of the aforementioned U.S. Pat. No. 3,885,283.

As will be also evident by reverting to FIG. 1, the pressure lines or conduits 5, leading to the groups of support pistons or elements 4, are supplied with the hydraulic pressurised fluid medium by a pump installation or unit 13. At the branches of the pressure lines 5, which branch-off from a common distribution line or conduit 5', there are connected pressing force regulators 14. These pressing force regulators or controllers 14 receive their set or reference value signals from a control device 16 by means of the control lines 15. The control device or control means 16 determine the pressing force between an upper and a lower coacting group of support or pressure elements 4.

The hydraulic pressure which has been set by the pressing force regulators 14 acts directly upon the support or pressure elements 4 of the lower roll 1, whereas in the line 5 leading to the corresponding upper or top support or pressure elements 4 there is arranged in each case a differential or difference regulator 17.

The differential regulators 17 of the pair of upper and lower coacting groups of support or pressure elements 4, which in each instance are connected with a common line, are subjected to the action of set value signals of position detectors or sensors 18 which input the set value signals by means of signal lines 20 to the differential regulators 17. The signal course of the position detectors 18 has been schematically indicated by the diagrams A in FIG. 1. As the displacement of the roll shell 3 of the lower roll 1 increases in relation to the housing 18' of the position feeler 18, which is attached to the related side plate or portion 6, the magnitude of the set value signal diminishes in accordance with the diagram A, which, in turn, results in a smaller pressure differential between the lower support elements 4 and the upper support elements 4 by virtue of the action of the differential regulator 17. The movements of the roll shell 3 relative to the housing or casing 18' is detected by a member 21. In accordance with the illustration this member or part 21 is connected with the bushing 10 of the arrangement as shown in FIG. 3, and thus, is movable in conjunction with the roll shell 3.

As also will be apparent by referring to FIG. 1, the left-hand depicted position detector or sensor 18 acts upon the left-hand illustrated three groups of support or pressure elements 4, whereas the right-hand illustrated position detector 18 acts upon the right-hand illustrated three groups of support or pressure elements 4. It is assumed that the control signal formed by each position detector 18 acts with the same controlling force or magnitude upon the pressure differential regulator 17. During operation there is obtained an equilibrium state, during which the difference between the larger force of the lower support elements 4 and the smaller force of the upper support elements 4 are exactly of the same magnitude as the weight of the movable parts which are located between the upper roll support 2 and the lower roll support 2. The weight of such moving parts is essentially the weight of the roll shells of the intermediate rolls 7 together with the weight of their bearings or mountings and the weight of the pistons of the support elements 4.

The pressing force between random two groups of oppositely effective support or pressure elements 4 can be independently adjusted by the pressing force regulators 14, for instance as a function of signals of the control device 16.

Since the entire roll bank, which is composed of the rolls 1 and 7, is supported along the entire roll length upon the support or pressure elements of the lower roll 1, there is precluded practically any sag or bending-through of the roll shells and the intermediate rolls, so that there is avoided the otherwise resulting problems heretofore discussed.

In order to eliminate the possibly disturbing influence of the weight of parts located at the ends of the roll shells 3 or the rolls 7, it is possible for the differential regulators 17, which are operatively associated with the groups of support elements 4 located at the roll ends, to receive additional set or reference value signals 22. By means of these additional set value signals 22 it is possible to reduce, for instance, the pressure force of such support elements by a constant amount. In order to compensate for bending moments there also can be accomplished a constant increase of the pressing force at a different location.

Figure 4:
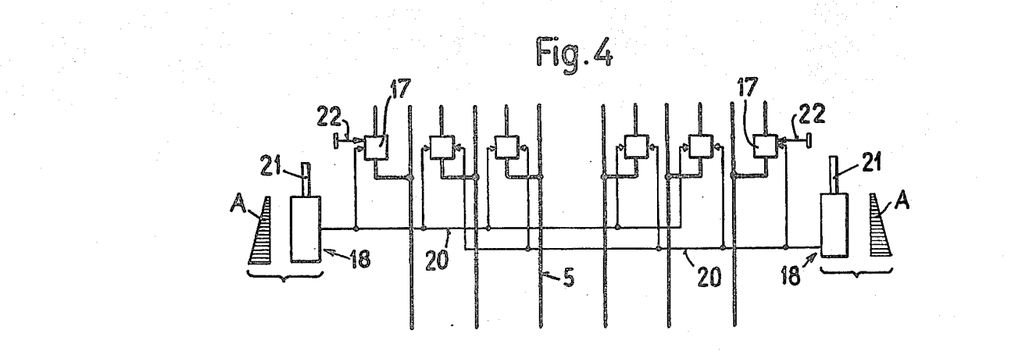
FIG. 4 illustrates one possibility for influencing the force differential regulator with the rolling mill arrangement shown in FIG. 1 by means of the position feelers arranged at both ends of the roll shell of the lower roll.
Figure 5:
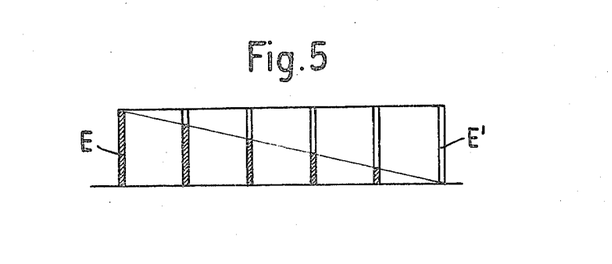
FIG. 5 is a graph serving to explain the principles of operation of the arrangement of FIG. 4.

Now in FIGS. 4 and 5 there is illustrated the possibility of differently influencing the differential regulators 17 by the control signals of the position detectors or sensors 18. With this system design there is not, as previously explained, acted upon the differential regulators of the related half of the roll with the same controlling force or magnitude, rather in accordance with the showing of FIG. 5 the differential regulators are acted upon with decreasing controlling force in proportion to their increasing distance from the corresponding roll end. The support or pressure elements 4 located at the roll end are thus totally acted upon, whereas the support elements located furthest from the roll end are not acted upon at all. The same also holds true for the position detector 18 located at the other end of the roll. According to the showing of FIG. 5 the controlling magnitudes or values E and E' of both position detectors or sensors 18 are chosen such that their sum is constant at all zones of the rolls, i.e. groups of support or pressure elements 4.

Figure 6:
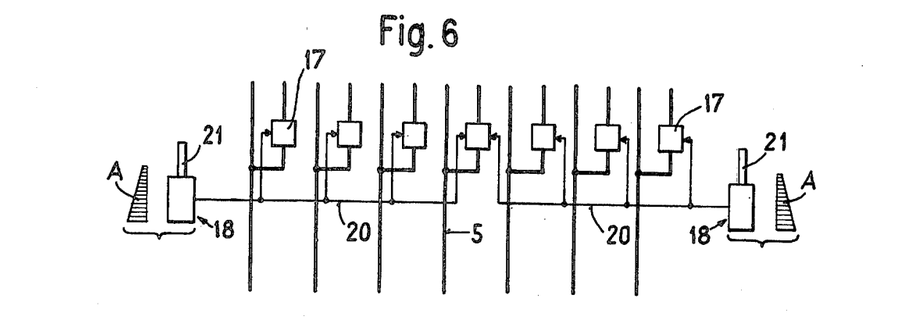
FIG. 6 illustrates an arrangement for demonstrating a different possibility of influencing the differential regulators by means of the signals of the position detectors.
Figure 7:
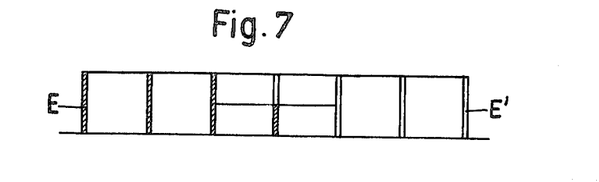
FIG. 7 is a graph serving to explain the systems operation of the arrangement of FIG. 6.

FIGS. 6 and 7 illustrate a possible combination of both previously discussed characteristics or patterns of the controlling magnitudes which, in particular, is advantageous for use with rolls working with an uneven number of zones. According to the showing of FIG. 7, in each instance the differential regulators 17 of the outer groups or zones experience the complete controlling magnitude or value, whereas the differential regulator 17 of the intermediate zone is acted upon by both position detectors 18 with one-half the controlling magnitude or value.

Figure 8:
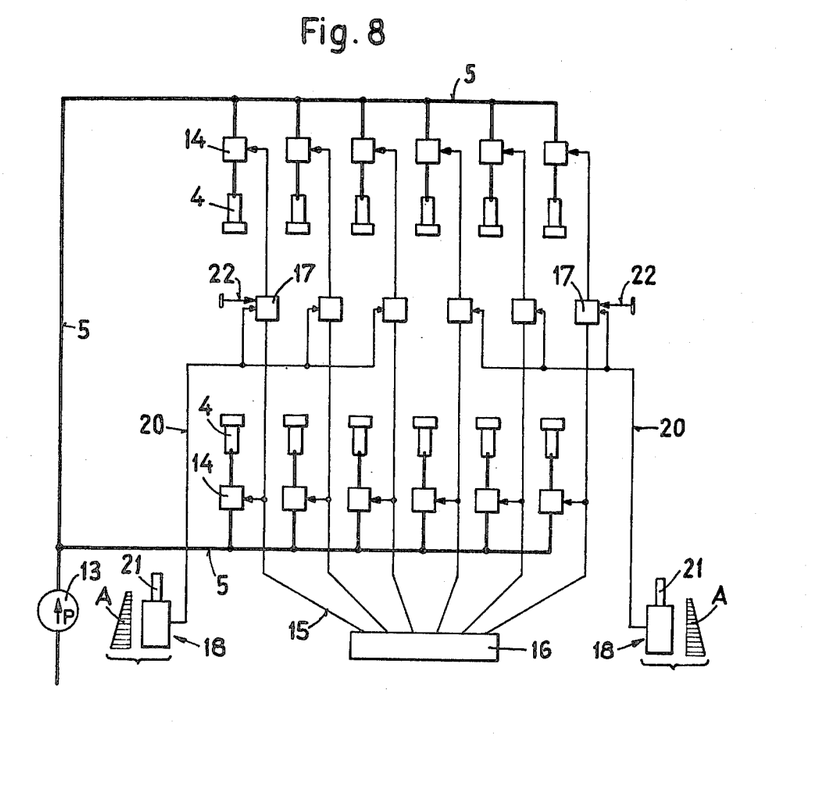
FIG. 8 illustrates schematically a different circuit arrangement of the differential regulators of the rolling mill depicted in FIG. 1.

FIG. 8 depicts a modified circuit arrangement of a rolling mill and constitutes a simplified form of the equipment shown in FIG. 1. Each group of support or pressure elements 4 takes the form of a single support or pressure element. As to the remaining construction it will be noted that the same reference characters have been used to denote the same or analogous elements as were employed with the rolling mill shown and described above in conjunction with FIG. 1.

With the embodiment of FIG. 8 each group of support or pressure elements 4 has its own pressing force regulator 14 which is connected to the pressure line or conduit 5. The pressing force regulators 14 of coacting support or pressure elements 4 are connected with a common control line 15 of the control device or control means 16. The differential or difference regulators 17, in this case, are not located in the energy line, i.e. in a branch of the pressure line 5, rather in the control line 15 defining an actuation line. Also in this case there can be provided the additional set or reference value signals 22.

The manner of influencing the differential regulators 17 as shown in FIG. 5 or in FIG. 7 also is here possible in the same manner as with the rolling mill depicted and described above in conjunction with FIG. 1.

Figure 9:
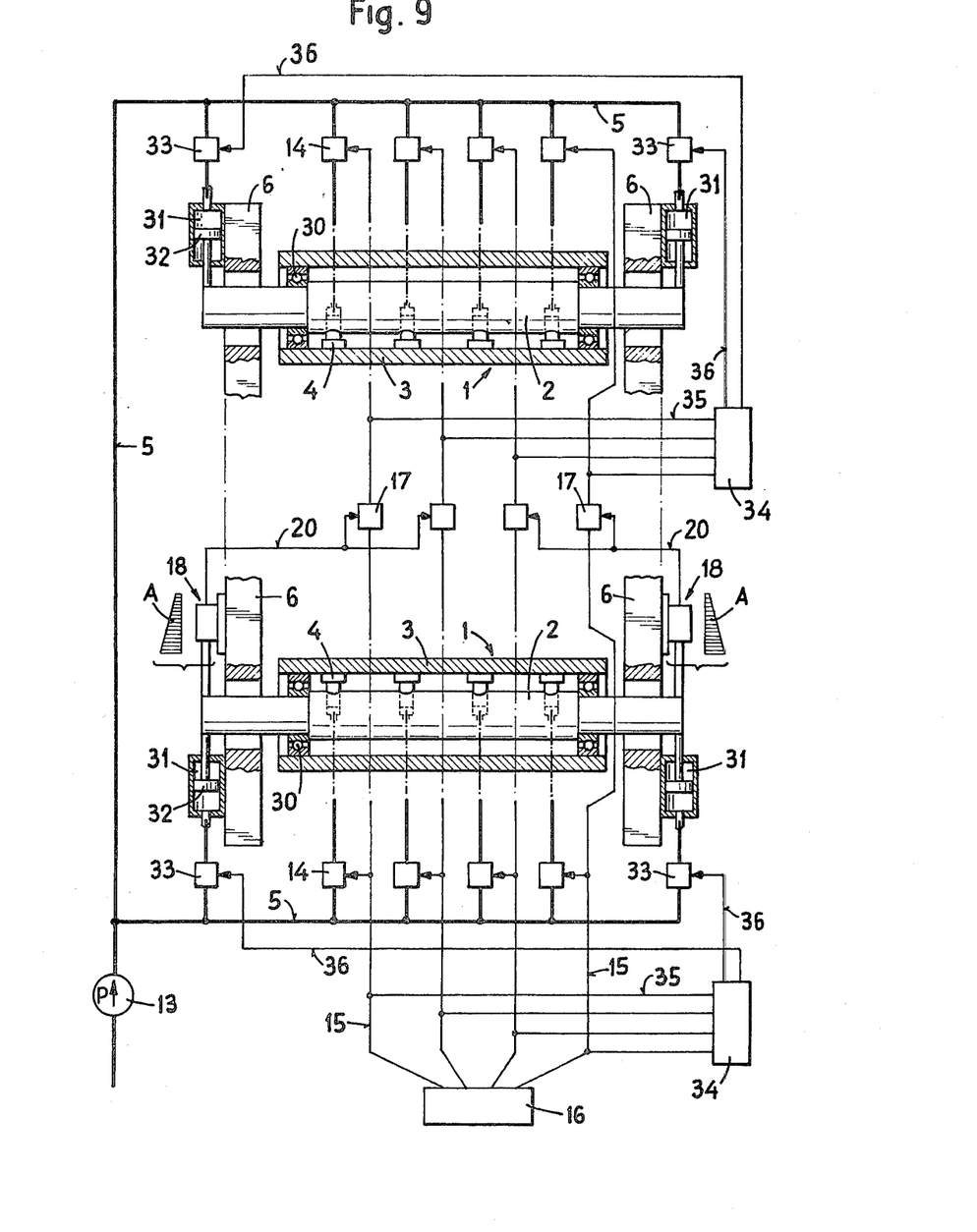
FIG. 9 illustrates the application of the teachings of the invention in conjunction with a rolling mill containing rolls which are mounted upon the roll support in the manner for instance disclosed in the aforementioned U.S. Pat. No. 3,802,044.

The rolling mill shown in FIG. 9 differs from the rolling mill of FIG. 1 essentially by virtue of the features that in this case there are used rolls of the type disclosed in the aforementioned U.S. Pat. No. 3,802,044, wherein the roll shell is mounted at its end at the roll support 2 upon roller bearings 30 or the like. The roll shells 2, in this case, are not rotatably mounted at the side plates or elements 6, however can be displaced in conjunction with the roll shells 3 in order to accomplish the pressing movements. For forming the pressing force there are provided at the ends of the roll shells 2 pressing cylinders 31, the pistons 32 of which are connected with the related roll support or beam 2.

The connecting of the support or pressure elements 4, the pressing force regulators 14 and the differential regulators 17 in this arrangement is the same as with the rolling mill depicted in FIG. 8, and also the action or function is the same.

As a modification of the embodiment depicted in FIG. 8 with the rolling mill shown in FIG. 9 also the cylinders 31 are connected by means of the pressing force regulators 33 to the pressure line 5.

Additionally, each roll 1 is equipped with a regulation device or regulator 34 which has infed thereto by means of the signal lines 35 the signals of the individual control lines 15 of the pressure force regulators 14. The regulator device 34 forms, as a function of such signals, output signals which are inputted by means of the control lines 36 to the individual regulators 33. These control signals are configured such that they correspond in each instance to the resultant of the force of the support or pressure elements 4, i.e., stated in another way, that the forces of the support elements 4 and the pistons 32 are always in an equilibrium condition such that the bearings 30 are relieved of load.

A regulation device suitable for this purpose has been disclosed in U.S. Pat. No. 4,023,480, granted May 17, 1977 and German Pat. No. 2,510,410, to which reference may be readily had and the disclosure of which is incorporated herein by reference. Such type of regulation device or regulator comprises a pneumatic-mechanical regulator, but however as explained at a later portion of this disclosure there can be used other embodiments operating according to this principle, such as for instance electrical or electronic in nature.

Figure 10:
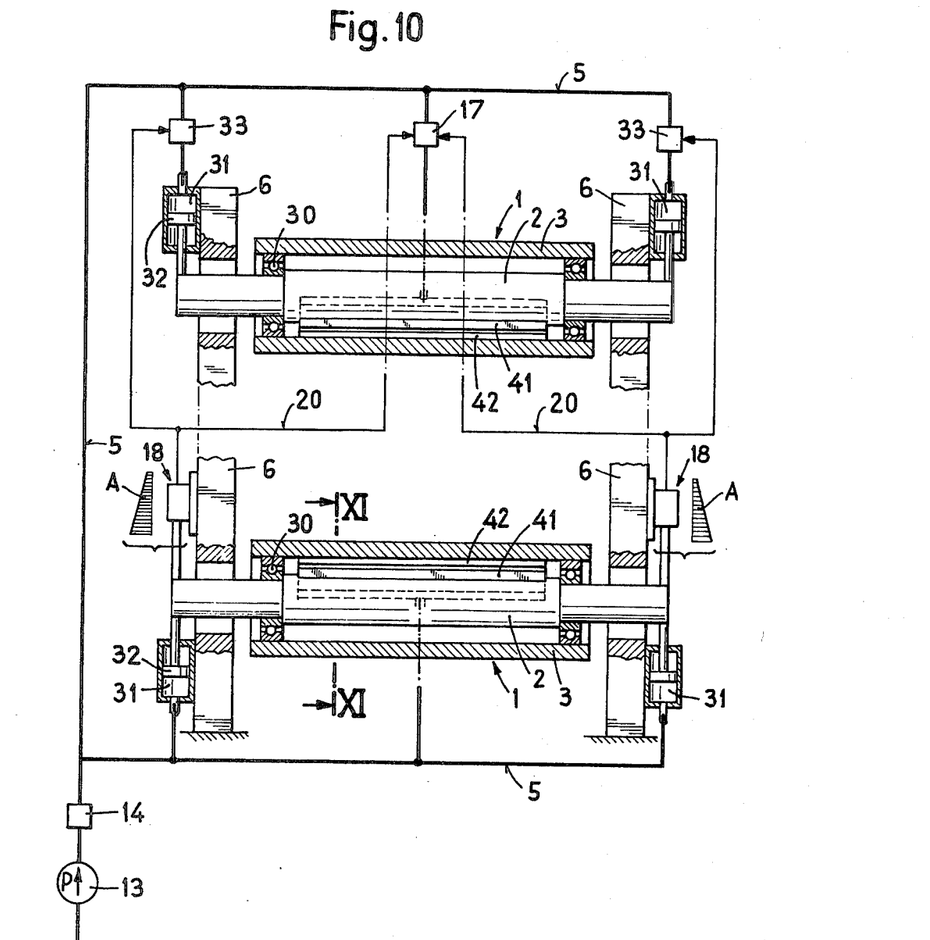
FIG. 10 schematically illustrates a rolling mill for explaining the use of the teachings of the invention in conjunction with a roll having a single pressure element extending over its length and equipped with external pressure or contact pistons.
Figures 11, 12:
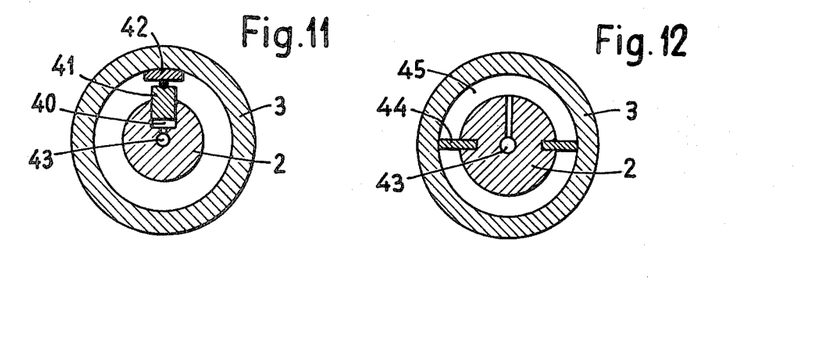
FIG. 11 is a cross-sectional view of the arrangement of FIG. 10, taken substantially along the line XI—XI thereof.
FIG. 12 is a sectional view, corresponding to the showing of FIG. 11, but portraying a further possible construction of the roll.

FIG. 10 illustrates a rolling mill containing rolls which, in similar fashion to the rolling mill construction of FIG. 9, contain roll shells mounted upon roll supports and external or outer pressing cylinders, but only a single support or pressure element between the roll support or beam and the related roll shell. Such type of-rolls, which have been schematically shown in sectional view in FIG. 11, are known for instance from German Pat. No. 1,461,066. In similar fashion there also can be used, however, for such rolling mill rolls of the type schematically shown in FIG. 12, which, for instance, are known in this art from German Pat. No. 1,411,327.

Thus, the roll depicted in FIGS. 10 and 11 contains a slot 40 formed in the roll support or beam 2 and within which slot 40 there is sealingly guided a ledge member 41 or the like upon which there is pivotably supported a sliding shoe 42. This slot 40, which forms a type of cylinder, has infed thereto the hydraulic pressurised fluid medium by means of a bore 43 provided in the roll support 2 and this bore 43 forms part of the pressurised fluid medium line 5 which has been schematically illustrated in FIG. 10.

With the roll depicted in FIG. 12 there is provided between the roll support or beam 2 and the roll shell 3 a pressure chamber or compartment 45 which is sealed-off by the seals 44. The pressure chamber 45 likewise has infed thereto the pressurised fluid medium, typically pressurised oil, by means of a bore 43.

With the variant embodiment of rolling mill disclosed in FIG. 10 the signals of the position detectors or sensors 18 are delivered by way of the signal lines 20 at the full controlling force or magnitude to the pressing force regulator 33 of the pressing cylinder located at the same side and with one-half of the controlling force or magnitude by means of both position detectors 18 to the difference or differential regulator 17. This however is subject to the precondition that the effective surfaces of the pistons 32 are selected such that each of them develops one-half of the pressing force of the support or pressure element constituted by the ledge member 41. If the relationship between these surfaces is other than just explained, then there must be employed in conventional manner ratio regulators which, for instance, reduce or increase in a constant relationship the pressure of the hydraulic medium supplied to the slot 40 in relation to the cylinders 31.

Figure 13:
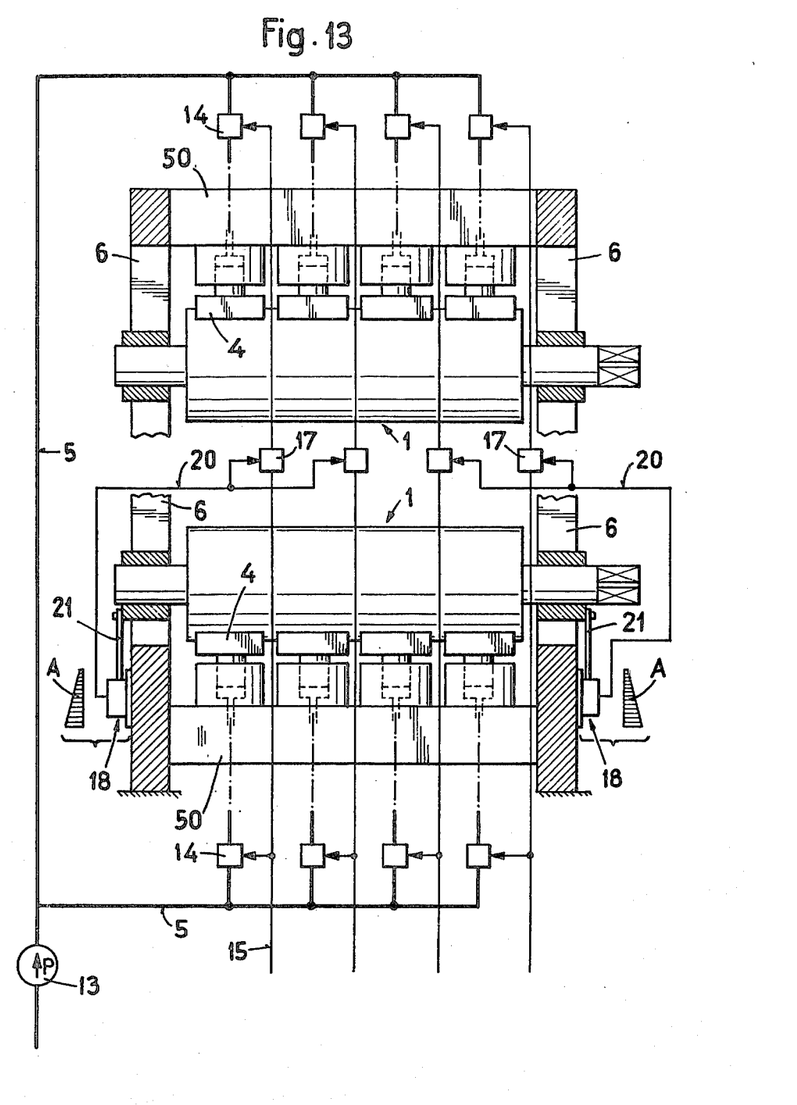
FIG. 13 illustrates a rolling mill having solid rolls and equipped with external support or pressure elements.

The rolling mill depicted in FIG. 13 differs from the rolling mill construction of FIG. 8 only in that here the rolls 1 are solid massive rolls. The support or pressure elements 4 act from the outside upon the rolls 1, as such is known from the aforementioned U.S. Pat. No. 4,041,752. The outer support or pressure elements 4 bear upon the transverse supports or cross-beams 50 which interconnect the side elements or plates 6.

Figure 14:
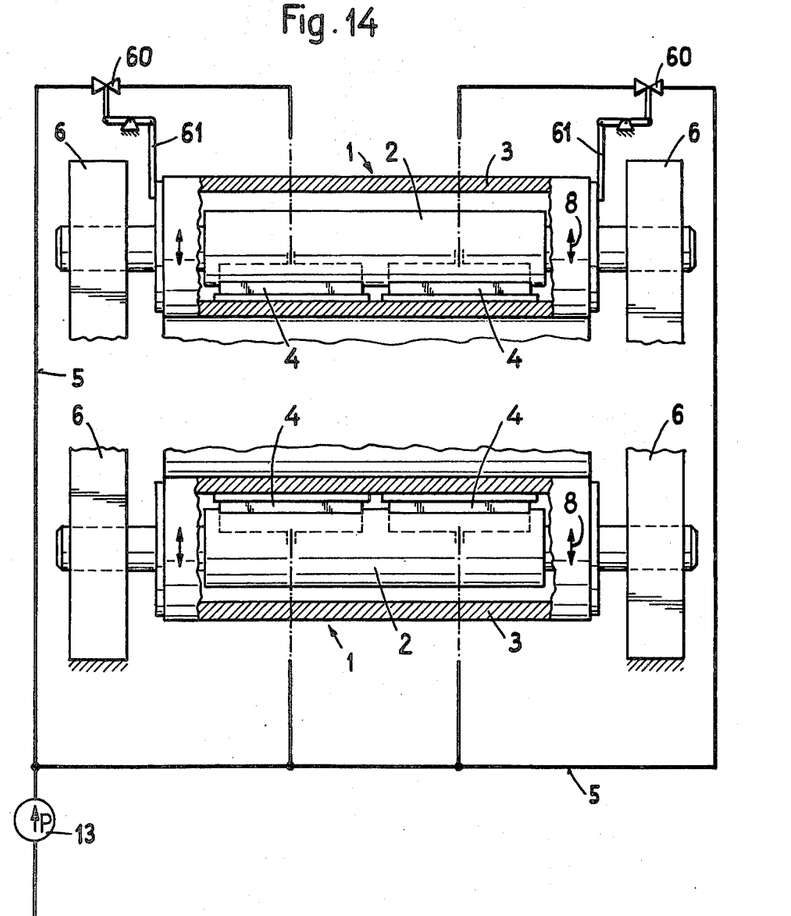
FIG. 14 schematically illustrates the utilisation of the teachings of the invention in a rolling mill containing rolls each having two support elements movable between a stationary roll support and a roll shell rotatable about such stationary roll support and which roll shell is movable relative to the roll support in accordance with the illustration of FIGS. 2 and 3.

FIG. 14 illustrates a particularly simple construction of the regulation of the rolling mill. The rolls 1 of this equipment shown in FIG. 14, just as was the case for the rolls of the arrangement of FIG. 1, possess a roll shell 3 rotatable about the related roll support or beam 2. This roll shell 3, as was the case for the arrangement of FIGS. 2 and 3, is displaceable in relation to its related roll support 2 in order to perform the pressing movements.

Each roll 1 is equipped with two support or pressure elements 4. Each such support element 4 extends up to the central region of its roll and is constructed in the manner described above with reference to FIG. 11. The support or pressure elements 4 can be, however, also replaced in each instance by a group of support elements 4 of the type disclosed in FIGS. 1 and 3, which however are conjointly impinged at the same pressure from the pressure line 5.

As will be apparent by referring to FIG. 14, the support or pressure elements 4 of the lower roll 1 are directly supplied at the full pressure of the supply or feed device 13. In the parts of the line leading to the support elements 4 of the upper roll there are connected throttle valves 60. These throttle valves 60 can be actuated by means of a related lever rod 61 or equivalent actuation element which, in each instance, is connected with the related end of the associated roll 1. The actuation is accomplished in the sense that when there occurs an upward movement of the roll shell 3 the related throttle valve 60 is actuated in the sense of opening the same, so that its throttle action is reduced. Consequently, just as was the case with the previously discussed exemplary embodiments, the pressure force of the downwardly directed support elements 4 of the upper roll increases to such an extent until there is established the aforementioned equilibrium condition.

Although the invention has been explained by way of example in conjunction with rolls equipped with hydraulically actuatable support or pressure elements, it should be expressly understood that the invention is not limited to such exemplary constructions of rolls, rather also can be beneficially employed with other types of rolls, for instance electromagnetic in nature.

Also the regulators can be of random design, such as for instance compressed air regulators, electrical regulators or electronic regulators.

With the inventive rolling mill designs both of the rolls 1 either can interact directly or by means of intermediate rolls. Also, random rolls can be designed in conventional manner to constitute drive rolls.

As concerns the position detectors or sensors 18 such also can be arranged at the upper roll 1 instead of at the lower roll 1, similar to the regulation valves 60 containing the actuation or feeler rods 61 of the arrangement of FIG. 14.

The use of two position detectors 18 or two regulator valves 60 at the ends of the related roll is assigned the task of ensuring for a parallelism of the movements of the rolls, for instance with their axes in the horizontal plane. In principle, it would also be possible to use a single position detector with rolls having a single zone or a single support or pressure element, if through the use of other means, for instance mechanical or hydraulic, there can be ensured for a parallel guiding of the roll or the roll shell, as the case may be.

Although in a number of figures of the drawings accompanying this disclosure the position detectors detect movements of the roll shell 3 in relation to the roll stand or framework in that its housing 18' is directly attached at the related side plate 6 of the roll stand, other types of arrangements of the position feelers are conceivable. Thus, in FIG. 3 there has been schematically indicated an arrangement wherein the housing 18' is secured at the cover of the related roll shell, whereas the part 21 is connected with the roll support or beam 2. This roll support 2, in turn, is connected with the roll stand or framework 6.

As to the magnitude of the movements which arise with the inventive designs of rolling mills for the purpose of accomplishing the control or regulation function and which are detected by the position detectors or sensors 18, such movements can amount to several centimeters, but however only need amount to fractions of millimeters. The position detector can be designed as a pneumatic, electrical or electronic unit or also can be constructed as a crystal device which, for instance, can be used for pressure measurements.

The additional set value signals 22 of the differential regulators 17 can be manually adjusted. However, it is also possible to use a position regulator 70 (FIG. 1) which compares the position signals of both position detectors 18 and the position of their movable parts 21 by means of signal lines 71 and when a difference is present, which corresponds to deviations from the horizontal position, influences by means of the output signal lines 72 the additional set value signals 22 in an appropriate fashion so as to again ensure that there is assumed the horizontal position.

Also there are known to the art rolls which constitute a combination of the rolls disclosed herein in the various exemplary embodiments described. Thus, for instance, in U.S. Pat. No. 3,879,827 and the German Pat. No. 2,332,861 there is described a roll wherein there is installed in a pressure chamber 45 of the type shown in FIG. 12 pressure pistons of the rolls shown in FIG. 1. In accordance with the German patent application No. P 30 03 395, and also disclosed in the publication "Das Papier", volume 5, 1980, pages 168 to 171, the pressure pistons are replaced by "pressure sinks", i.e. spaces or chambers having controlled lower pressure. The invention can be used in analagous fashion for such rolls in that, for instance, the control devices of FIGS. 9 and 10 are combined with one another.

Rolling mills constructed in accordance with the teachings of the invention can be beneficially employed for the most different fields of application or purposes. Thus, they can be used with a number of intermediate rolls for calendaring paper webs or plastic foils. On the other hand, suitable constructions of the rolls enable them to be used for processing metals, especially metal foils.

While there are shown and described present preferred embodiments of the invention, it is to be distinctly understood that the invention is not limited thereto, but may be otherwise variously embodied and practiced within the scope of the following claims. Accordingly,

What I claim is:

1. A rolling mill comprising:
   two rolls acting in opposition to one another in a substantially vertical pressing plane and defining a lower roll and an upper roll;
   each of said rolls having cylindrical rotatable parts which act upon a coacting counter roll;
   a plurality of support elements for supporting the cylindrical rotatable parts substantially along their entire length and with an adjustable pressing force;
   each of said support elements being operative in a predetermined pressing direction;
   the support elements of said two rolls acting in opposition to one another in pairs to produce said pressing force;
   at least the cylindrical rotatable parts of the upper and lower rolls being movable in the substantially vertical pressing plane;
   a common actuation line for each of the pairs of support elements which act in opposition to one another upon the two rolls;
   each said pair of support elements defining a lower support element for the lower roll and an upper support element for the upper roll;
   said common actuation line extending from said lower support element to said upper support element of said pair of support elements acting in opposition to one another;
   said common actuation line serving to control the pressing force exerted by said pair of support elements;
   a plurality of said pairs of lower and upper support elements being arranged in individual groups at said lower and upper rolls, respectively, and extending in a lengthwise direction of said rolls;
   at least one position detector provided for the rotatable part of one of the rolls and serving for the detection of the position of said rotatable part relative to a stationary part of the rolling mill;
   a regulation device arranged at said common actuation line extending between said pair of support elements and upon which acts said position detector;
   a respective common actuation line and regulation device being provided for each individual group of said lower and upper support elements;
   said at least one position detector acting upon said regulation devices for controlling operation of said plurality of pairs of support elements;
   said regulation devices serving to control a force differential between a larger pressing force of the lower support elements of the lower roll in relation to a lower pressing force of the upper support elements of the upper roll as a function of the position of said rotatable part of said one roll provided with said at least one position detector in order to control the position of the rotatable parts of the upper and lower rolls in response to detection of the position of said rotatable part of said one roll provided with said at least one position detector; and
   the resultant of the pressure force of the lower support elements of the lower roll decreasing with increasing height of the position of the rotatable part thereof until there is attained an equilibrium position in a manner such that during operation, in the equilibrium position, the upwardly directed force of the lower support elements of the lower roll is essentially equal to the sum of the downwardly directed pressing force of the upper support elements of the upper roll and the weight of all movable parts located therebetween.

2. The rolling mill as defined in claim 1, wherein:
   said rotatable part of at least one of the rolls being constituted by a roll shell of said one roll;
   said roll having a stationary roll support about which there is rotatable said roll shell; and
   at least one of the support elements being disposed between the roll support and the roll shell.

3. The rolling mill as defined in claim 2, wherein:
   the roll shell is movable relative to the roll support in the pressing plane in order to perform a pressing movement; and
   a roll stand at which there is supported the roll support.

4. The rolling mill as defined in claim 2, further including:
   means for rotatably mounting the roll shell upon the roll support;
   said roll support performing pressing movements in conjunction with the roll shell; and
   outer pressing cylinders engaging at the ends of the roll support provided for said roll.

5. The rolling mill as defined in claim 1, wherein:
   said rotatable part of at least one of said rolls constitutes the body of a roll;
   said support elements defining at least one outer support element at which there is supported said roll body; and
   said outer support element acting upon the surface of said roll body.

6. The rolling mill as defined in claim 1, wherein:
   said position detector comprises a signal transmitter for forming a set value signal; and
   said regulation device comprising at least one differential regulator receiving said set value signal and serving to influence the force differential of the support elements.

7. The rolling mill as defined in claim 6, further including:
   a control signal line in which there is arranged said differential regulator;
   pressing force regulators provided for the support elements and governing the pressing force;
   said control signal line leading to said pressing force regulators;
   said actuation line including energy lines provided for the support elements; and
   said pressing force regulators being arranged in said energy lines of said support elements.

8. The rolling mill as defined in claim 6, further including:
   said actuation line including energy lines provided for said support elements; and
   said differential regulators being arranged in said energy lines of said support elements.

9. The rolling mill as defined in claim 1, wherein:
   said position detector forms a signal which with increasing elevational position of its related rotatable part corresponds to a smaller force differential.

10. The rolling mill as defined in claim 1, further including:
    a respective position detector provided for each end of one of said two rolls at the ends of the rotatable part thereof; and
    each said position detector being effective upon support elements operatively correlated to the related side of said roll.

11. The rolling mill as defined in claim 1, wherein:
    each of said rolls is provided with a plurality of said support elements;
    the support elements effective in opposition to one another at both of said rolls each being connected to a common energy line defined by said actuation line;
    said common energy line being provided with at least one pressing force regulator; and
    said pressing force regulator being operatively associated with said regulation device constituting at least one differential regulator.

12. The rolling mill as defined in claim 11, wherein:
    said plurality of said support elements provided in one of the rolls extend from a related end of the roll up to its central region; and
    the position detector controlling by means of its set value the differential regulator of the support elements located at its side with essentially the same controlling magnitude.

13. The rolling mill as defined in claim 12, wherein:
    an uneven number of said support elements is provided;
    two of said position detectors being provided, one at each opposed end of the related roll; and
    an intermediate support element of said support elements being controlled by both said position detectors with approximately one-half of the controlling magnitude.

14. The rolling mill as defined in claim 11, wherein:
    set value signals of position detectors located at both ends of the rolls act with decreasing controlling magnitude upon the differential regulator as a function of the distance from the end of the roll from which there is located the related position detector; and
    the sum of the controlling magnitudes of the set value signals of both position detectors being essentially constant at all of the differential regulators.

15. The rolling mill as defined in claim 1, wherein:
    said regulation device comprises differential regulators;
    the differential regulators of the support elements being provided at locations of the rolls of the rolling mill with additional set value signals for compensation of deviations at those locations of the rolls of the rolling mill at which deviations exist from the uniform distribution of the weight.

16. The rolling mill as defined in claim 15, further including:
    a position regulator means which is connected with the position detectors by signal lines; and
    upon deviation of the related rotatable part from a horizontal position said position regulator means influencing by means of output signal lines the additional set value signals.

17. The rolling mill as defined in claim 1, wherein:
    each of said rolls is provided with a plurality of said groups of support elements;
    the support elements effective in opposition to one another at the groups of support elements each being connected to a common energy line defined by said actuation line;
    said common energy line being provided with at least one pressing force regulator; and
    said pressing force regulator being operatively associated with said regulation device constituting at least one differential regulator.

18. The rolling mill as defined in claim 17, wherein:
    said plurality of said groups of support elements provided in one of the rolls extend from a related end of the roll up to its central region; and
    the position detector controlling by means of its set value the differential regulator of the group of support elements located at its side with the same controlling magnitude.

19. The rolling mill as defined in claim 18, wherein:
    an uneven number of said groups of support elements is provided;
    two of said position detectors being provided, one at each opposed end of the related roll; and an intermediate group of said support elements being controlled by both position detectors with approximately one-half of the controlling magnitude.

20. The rolling mill as defined in claim 17, wherein:
set value signals of position detectors located at both ends of the rolls act with decreasing controlling magnitude upon the differential regulator as a function of the distance from the end of the roll from which there is located the related position detector; and the sum of the controlling magnitudes of the set value signals of both position detectors being essentially constant at all of the differential regulators.

* * * * *